Figure 6:
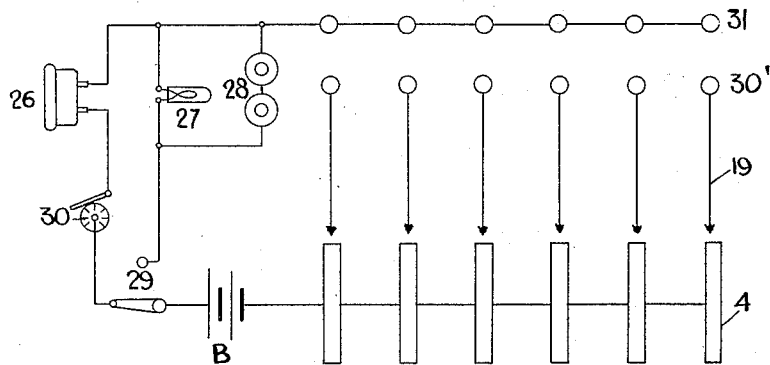

C. R. AND R. WOODLAND.
APPARATUS FOR TEACHING CODES AS USED IN TELEGRAPHY.
APPLICATION FILED JULY 5, 1919.
1,343,754.
Patented June 15, 1920.
2 SHEETS—SHEET 1.
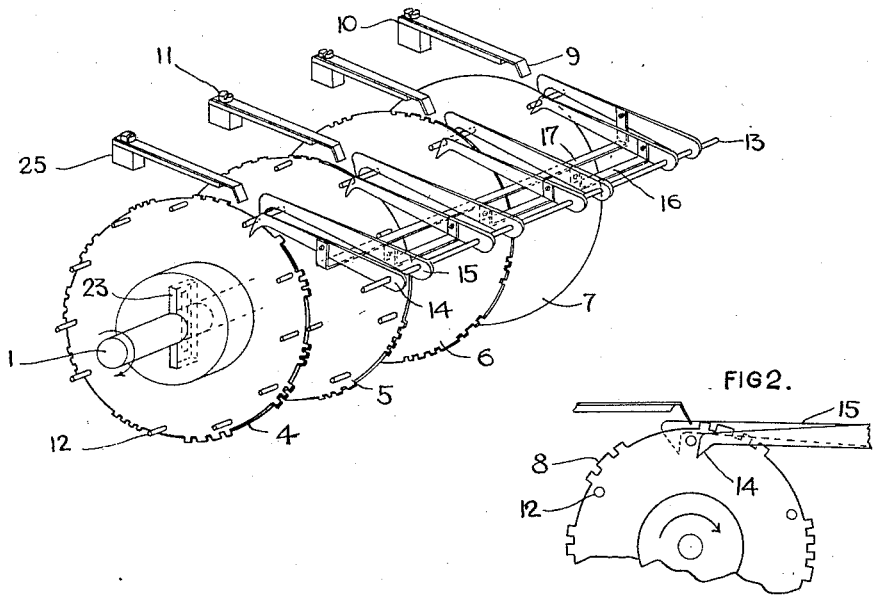
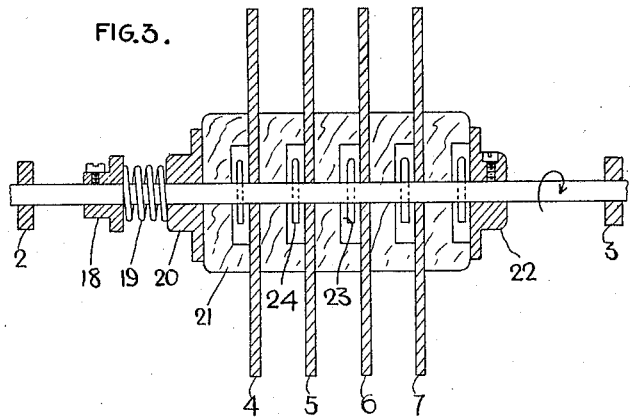
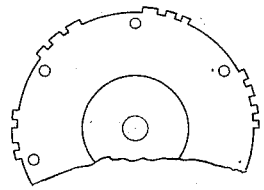
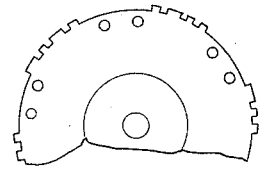
Inventors:
Cecil Robert Woodland.
Reginald Woodland.
F. C. Tomkins
Their Attorney.

C. R. AND R. WOODLAND.
APPARATUS FOR TEACHING CODES AS USED IN TELEGRAPHY.
APPLICATION FILED JULY 5, 1919.

1,343,754.

Patented June 15, 1920.

Inventors:

Their Attorney.

UNITED STATES PATENT OFFICE.

CECIL ROBERT WOODLAND AND REGINALD WOODLAND, OF LIVERPOOL, ENGLAND.

APPARATUS FOR TEACHING CODES AS USED IN TELEGRAPHY.

1,343,754. Specification of Letters Patent. Patented June 15, 1920.

Application filed July 5, 1919. Serial No. 308,839.

*To all whom it may concern:*

Be it known that we, CECIL ROBERT WOODLAND and REGINALD WOODLAND, of the city of Liverpool, in the county of Lancashire, England, have invented a certain new and useful Improvement in Apparatus for Teaching Codes as Used in Telegraphy, of which the following is a specification.

This invention relates to apparatus for teaching signal codes, such as the Morse, which are used in telegraphy.

In teaching students a telegraphic code, it is the usual practice to produce in a telephone receiver or buzzer, a series of sounds, audible to the learner and corresponding to the code of the letters transmitted. The transmission of such signals is usually performed by skilled telegraph operators, this method being, consequently, rather expensive. It is desirable, therefore, to provide an apparatus for automatically producing the impulses of signals according to the code.

Such an apparatus should be of simple and reliable construction and capable of sending a large series of individual signals or code, while the speed of delivery of the signals should be readily variable to suit the particular stage of skill attained by the student.

An apparatus which it is obviously possible to use for this purpose is the well known tape transmitter, largely employed in telegraph systems, in which a moving paper tape, perforated in accordance with the impulses of the signals, engages contact brushes and produces in a circuit connected thereto, a series of impulses corresponding to the perforations. In such an apparatus, however, the perforations in the paper tape, if the latter is passed through the apparatus a number of times, are liable to become worn, thereby producing mutilated signals unintelligible to a student. Although the speed of the tape may be reduced to increase the time interval between letter signals, to suit the requirements of a beginner, this operation would also prolong the impulses for the letters themselves, which would then be understood only with difficulty by such a person.

It is the object of our invention to provide a simple apparatus for the teaching of a code which obviates the defects of a transmitter operated by a paper tape, while being capable of producing a large series of signals at a speed which is readily variable to suit the needs of the student.

To this end, according to our invention, an apparatus for this purpose comprises a plurality of disks having located thereon contact operating members for operating a contact or contacts in the circuit of the receiving instrument, the disks being so interconnected and controlled that they move successively through predetermined spaces or portions of a revolution, whereby, after one disk has moved through the required space or portion of a revolution to transmit a certain number of impulses, as for a letter, the next disk performs a similar operation.

The disks may be driven from any convenient source of power, the speed of which can be readily regulated, as an electric or clockwork motor, while for a beginner only one disk may be used to send impulses to his receiving apparatus, the interval between signals being then equal to the time of the whole cycle of operations and thereby allowing the learner sufficient time to read and understand the letters transmitted.

We have found that a convenient way of rotating the disks bearing the code signals is by means of a suitable friction drive. By this arrangement, the disks may be driven from a single constantly rotating shaft, the rotation of each disk being stopped and initiated by simply holding and releasing it, the other disks continuing their rotation after one disk is held, until they are held in a similar manner. In order to obtain a long series of code characters before repetition, we prefer to arrange that the disks are provided with different numbers of code characters or combined code characters and code spaces.

The invention will be fully understood from the following description of one specific embodiment taken in connection with the accompanying drawings, in which—

Figure 7:
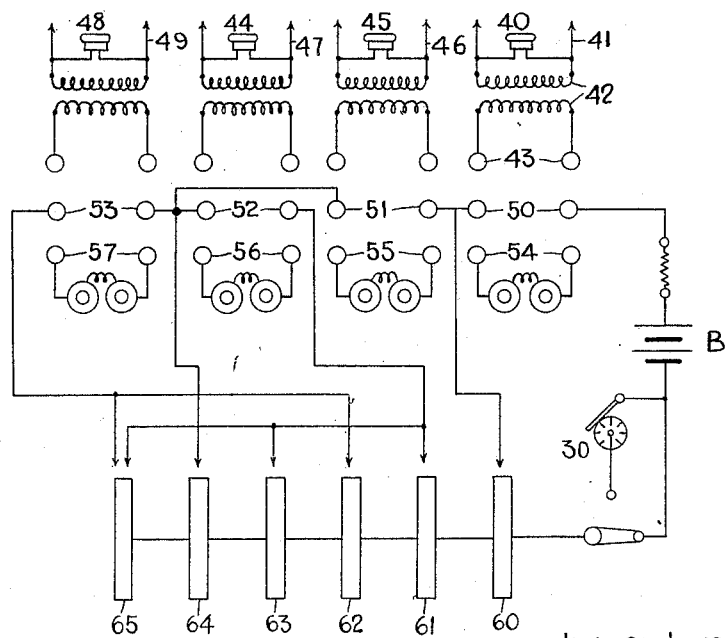

Figure 1 is a perspective view showing the disks and the controlling mechanism therefor, Fig. 2 is a view showing the holding and releasing rods controlling the movement of one disk, Fig. 3 is a sectional view showing the disks and the method of driving the same, Figs. 4 and 5 show portions of two disks and the arrangement of the projections thereon together with the pawl operating pins, Fig. 6 is a diagram of connections of the apparatus when one speed of receiving is obtained at any one time, Fig. 7 is a similar diagram of connections of the apparatus giving a plurality of receiving speeds at any one time.

The apparatus is conveniently inclosed in a suitable case, and consists of a shaft, 1, journaled in bearings indicated at 2 and 3. The shaft 1, may be driven continuously in the direction indicated by the arrow, from a convenient source of power, the usual type of clockwork gramophone motor being suitable for this purpose, although a small electric motor may be used if desired. Loosely mounted on the shaft 1, are a number of disks or wheels, 4, 5, 6 and 7. In the drawings four disks are shown, but any suitable number may be provided according to the number of code signals in the series it is desired to obtain before repetition. Upon the periphery of the disks are a number of contact operating members or projections, 8, formed integrally therewith, these projections being arranged in accordance with the code of the signals it is desired to produce, suitable spaces, to produce the usual time intervals, being left between each set of projections representing a character. A contact brush, 9, is provided for each disk, the end of which brush is arranged to be engaged by the tops of the projections upon the disks, during their rotation, but to remain out of engagement or electrical connection with the disks when the latter are at rest, as clearly shown in Fig. 2 of the drawings. We prefer to mount the contact brushes, 9, which are of thin sheet copper or brass, upon metallic members, 10, of shorter length, attached by screws, 11, to small blocks of metal 25. The provision of the members, 10, insures that the bent over end portions of the brushes do not touch the disks proper, as distinct from the projections thereon, when out of contact with the projections, and the transmission of the code impulses of correct duration over an electric circuit connected to the brushes.

The projections, 8, upon the disks, in rotating, rub against the brush, 9, engaging therewith, and send over a circuit connected thereto a number of groups of long and short impulses of current separated by suitable time intervals, each group forming the code signal of the character represented by the particular group of projections passing under the brush.

A group of letters, though not being an actual word, may be regarded as such for code learning purposes. Passing through the disks at points immediately following, in order of rotation, the last projection of each character, are a series of pins, 12, projecting for a short distance, as shown in Fig. 1, on each side of the disks. Pivotally mounted upon a shaft, 13, are a series of rocking rods, two such rods, 14 and 15, being provided for each disk, one on each side thereof. The ends of the rods are shaped as shown to act as pawls, the ends of the rods, 14, resting before the pins, 12, in the direction of rotation when the latter are in their normal or resting position, and, by engaging the pins, operate to hold the disks against rotation. The ends of the rods, 15, upon the other sides of the disks, lie just behind the pins, 12, and are so shaped, as shown, that the pins will rotate past and in doing so will lift the rods. The construction is clearly shown in Fig. 2.

The rod, 14, of one disk is connected, by means of the arm, 16, to the rod, 15, of the next disk, while the rod 15 of the last disk is connected by the arm 17 to the rod 14 of the first disk, as will be seen from Fig. 1 of the drawings. With this controlling arrangement, upon a pin 12 passing under the end of the rod 15 of one disk, and bringing this disk to rest by engaging with the end of the rod 14, the rod 14 of the next disk is raised, thereby allowing the disk to rotate.

Securely attached to the shaft, 1, is a collar 18, a spiral spring 19 being located, around the shaft, between the collar 18 and a movable plate 20. Between the plate 20 and the first disk 4, is a wooden collar 21, keyed to the shaft, a similar collar being provided between the disks and also between the last disk and a plate 22 fixed to the shaft. A slot 23, as shown in Fig. 1, is cut in each of the collars 21, pins 24 passing through the shaft and engaging the slots in the collars. In this way the collars are driven by the shaft and operate in turn to drive the disks. When the latter are held, however, by the pins 12 engaging the ends of the rods 14, the collars rotate against the face of the disks without injury to the apparatus. This friction drive forms a very convenient method of driving the disks, as the movement of each of the latter can be very readily arrested and initiated again immediately the disks commence to rotate upon the removal of the holding pawl.

In order to produce a long series of impulses without repetition, we conveniently arrange that the disks have different members of sets of projections, or sets of projections and word spaces, thereon. For example, the disk 4 may have twenty sets of projections representing code letters or characters, the disk 5 twenty one code letters, the disk 6 twenty two combined code letters and word spaces, and so on. Also in order to form a long interval after a certain number of characters, and to split up the series into groups of characters, one or more of the disks may have some of the sets of projections spaced apart a greater distance than upon the other disks, pins being provided in the disks about the mid point of the space as represented in Fig. 5.

Fig. 6 shows one of the simplest ways in which the apparatus may be connected up electrically, in order to supply impulses according to the code, one speed of reception being obtained at any one time at a single receiving set. In this figure, the telephone receiver is shown at 26, a lamp at 27, and a telegraph sounder at 28. A switch 29, is arranged to place either the receiver 26, or the lamp and sounder, in circuit at the will of the operator. In circuit with the receiver 26, is an interrupter 30, which may take the form of a disk having alternate portions of insulating and conducting material upon its periphery, the disk being driven by suitable gearing from the shaft 1 of the apparatus. In place of such a mechanical interrupter, an electric buzzer interrupter may be used.

In Fig. 7 another method of connecting up the apparatus is shown, in order to supply code signals at several speeds at the same time to several groups of students, this method being more fully explained hereinafter.

In operation, the shaft 1 of the appaartus is revolved continuously by any suitable means, as before described. The operation may be initiated by lifting the rod 14 of the first disk away from the pin 12 engaging it, when the disk 4 is rotated, by the engagement therewith of the wooden collar upon the shaft, until the next pin 12 in the disk engages the end of the rod 14, thereby bringing the disk to rest. Just before engaging the rod 14, the pin 12 passes under the end of the rod 15 upon the other side of the disk 4, lifting the rod slightly. This movement is transmitted, by means of the arm 16, to the rod 14 of the next disk 5, so that this rod is lifted out of engagement with the pin 12 and the disk 5 released. The latter thereupon rotates until the next pin 12 therein brings it to rest by engaging the end of the rod 14, starting, just before doing so, the next disk 6 in a similar manner to the way in which the former disk 5 was started. In this way, each disk is rotated in turn through a distance equal to the distance between the pins. When the pin 12 upon the last disk 7 passes under the rod 15 thereupon, the lifting movement imparted to this rod is transmitted to the rod 14 of the first disk 4, through the arm 17, so that this disk is again operated and the cycle of operations repeated.

The projections upon the disks, by engaging the brushes 9, close the circuit or circuits, of which the brushes and disks may form part, a number of times for long and short periods, in accordance with the long and short projections upon the disks. For example, in Fig. 6, these circuits extend from battery B, disks 4, brushes 9, terminals 30' and 31, which are bridged electrically in any suitable manner, through either the sounder windings and lamp or the receiver and interrupter, according to the position in which the switch is placed, to the other pole of the battery. If the terminals connected to the brushes of all the disks are connected to the corresponding terminals on the receiving side of the circuit, impulses will be supplied from all the disks to the receiving apparatus, it being possible to connect up any number of these and in any order, to transmit the impulses at a rate convenient to the student. The lamp and sounder, if connected in circuit, operate in accordance with the code of impulses transmitted from the disk or disks, these operations representing a series of characters. If the telephone receiver is used, the interrupter breaks up the current impulses into pulsating current, which produces an audible tone in the receiver. The series of impulses may be interrupted by intervals of convenient length by arranging one or more of the disks as shown in Fig. 5, with additional pins therein, as previously described.

For students just beginning to learn a code, only one set of terminals would be electrically connected to the receiving set. Impulses would then be received from only one disk; the remaining disks would still perform their rotational movements, but would not produce current impulses. The student thus receives one code letter, followed by a long space or time interval before the next letter is transmitted, this giving him time to ponder over the first letter before receiving the next one. By using alternate disks, we reduce this time interval by half. If all the disks are used, only the usual time intervals are used.

It may be that in a large class of students, some are at a more advanced stage in learning the code than others, and are therefore able to receive signal characters at a higher speed. It is therefore desirable to supply character signals at a slower rate to some of the students. Fig. 7 shows, by way of example, a method of connecting up a number of receiving sets to accomplish this result. In this particular instance six disks are used, the last disk being provided with two separate brushes engaging the projections upon that disk. The receivers of those students who are most advanced, are connected, as the receiver 40, across the conductors 41. These conductors are connected to the secondary coil of an induction coil 42, the primary coil of which is connected to a pair of terminals 43. The receivers of less advanced students are connected as the receivers 44 and 45 to the leads 46 and 47, which are connected, in a manner similar to the connections of the conductors 41, to windings of induction coils. The least advanced students have their receivers connected, as the receiver 48, to the conductors 49. The impulses from the brushes pass to pairs of terminals 50, 51, 52 and 53, while sounders are connected to terminals 54, 55, 56 and 57. It will be understood that middle pairs of terminals 50 to 53, may be connected, by bridging corresponding contacts, either to the telephone receivers or to the sounders. With this particular arrangement, the receivers connected in parallel with the receiver 40, receive six characters for each cycle of operations of the six disks, the receivers 44 and 45 five and three characters, and the receiver 48 two characters.

If the telephone receivers are connected up, upon the operation of the disk 60, the receiver 40 and the receivers in parallel therewith, receive the impulses for one character. The disk 61, upon operating, sends impulses to receivers 40, 44 and 45, the disk 62 to receivers 40, 45 and 48, disk 63 to 40, 44 and 45, disk 64 to 40, and 45, while disk 65 sends impulses to all the receivers. The telegraph sounders may be connected up in place of the telephone receivers. By suitably connecting up the receiving sets to the disks the number of character signals during a cycle of operations may be adjusted as desired.

The projections upon the disks, instead of themselves forming part of the electric circuit, may operate a circuit closing member to transmit the impulses for the characters.

What we claim and desire to secure by Letters Patent of the United States is:—

1. An apparatus for producing electric impulses representing a series of characters according to a code, comprising a plurality of disks, contact operating members carried by said disks, a receiving instrument, contacts in the electric circuit of said instrument, said contact operating members being adapted to close the contacts in the circuit of the receiving instrument, a shaft upon which said disks are loosely mounted, means for continuously rotating said shaft, frictional driving means between the shaft and disks for rotating the disks, and means for controlling the movement thereof so that they move successively through predetermined portions of a revolution, and after one disk has moved through the required portion of a revolution, to transmit a certain number of impulses, the next disk performs a similar operation.

2. An apparatus for producing electric impulses representing a series of characters according to a code, comprising a plurality of disks, sets of projections upon the periphery of said disks, a receiving instrument, brush arms positioned in operative relation to engage said projections during the rotation of said disks, said projections and brush arms being located in an electric circuit of the receiving instrument, a shaft upon which said disks are loosely mounted, means for continuously rotating said shaft, frictional driving means between the shaft and disks for rotating the disks, and means for controlling the movement thereof so that they move successively through predetermined portions of a revolution, and after one disk has moved through the required portion of a revolution to transmit a certain number of impulses, the next disk performs a similar operation.

3. An apparatus for producing electric impulses representing a series of characters according to a code, comprising a plurality of disks, sets of projections upon the periphery of said disks, the number of said sets of projections being different for each disk, a receiving instrument, brush arms positioned in operative relation to engage said projections during the rotation of said projections during the rotation of said disks, said projections and brush being located in an electric circuit of the receiving instrument, a shaft upon which said disks are loosely mounted, means for continuously rotating said shaft, frictional driving means between the shaft and disks for rotating the disks, and means for controlling the movement thereof so that they move successively through predetermined portions of a revolution, and after one disk has moved through the required portion of a revolution to transmit a certain number of impulses, the next disk performs a similar operation.

4. An apparatus for producing electric impulses representing a series of characters according to a code, comprising a plurality of disks, contact operating members carried by said disks, a receiving instrument, contacts in the electric circuit of said instrument, said contact operating members being adapted to close the contacts in the circuit of the receiving instrument, a shaft upon which said disks are loosely mounted, means for continuously rotating said shaft, collars fixed to the shaft and engaging the sides of the disks for driving the same, and means for controlling the movement thereof so that they move successively through predetermined portions of a revolution, and after one disk has moved through the required portion of a revolution to transmit a certain number of impulses, the next disk performs a similar operation.

5. An apparatus for producing electric impulses representing a series of characters according to a code, comprising a plurality of disks, sets of projections upon the periphery of said disks, a receiving instrument, brush arms positioned in operative relation to engage said projections during the rotation of said disks, said projections and brush arms being located in an electric circuit of the receiving instrument, a shaft upon which said disks are loosely mounted, means for continuously rotating said shaft, collars fixed to the shaft and engaging the sides of the disks for driving the same, and means for controlling the movement thereof so that they move successively through predetermined portions of a revolution, and after one disk has moved through the required portion of a revolution to transmit a certain number of impulses, the next disk performs a similar operation.

6. An apparatus for producing electric impulses representing a series of characters according to a code, comprising a plurality of disks, sets of projections upon the periphery of said disks the number of said sets of projections being different for each disk, a receiving instrument, brush arms positioned in operative relation to engage said projections during the rotation of said disks, said projections and brush arms being located in an electric circuit of the receiving instrument, a shaft upon which said disks are loosely mounted, means for continuously rotating said shaft, collars fixed to the shaft and engaging the sides of the disks for driving the same, and means for controlling the movement thereof so that they move successively through predetermined portions of a revolution, and after one disk has moved through the required portion of a revolution to transmit a certain number of impulses, the next disk performs a similar operation.

7. An apparatus for producing electric impulses representing a series of characters according to a code, comprising a plurality of disks, contact operating members carried by said disks, a receiving instrument, contacts in the electric circuit of said instrument, said contact operating members being adapted to close the contacts in the circuit of the receiving instrument, means for rotating the disks, pins carried by said disks, said pins being located upon the disks just behind, in the direction of rotation, the last projection representing a character, a holding and a starting rod for each disk, located one on each side thereof, the starting rod of one disk being connected to the holding rod of the next, the end of the holding rods being shaped so as to stop the movement of a pin and the disk thereof when said pin engages it, the ends of the starting rods being so shaped that a pin, in rotating, will pass under and lift the rod, this movement lifting the holding rod of the next disk to initiate its operation.

8. An apparatus for producing electric impulses representing a series of characters according to a code, comprising a plurality of disks, sets of projections upon the periphery of said disks, a receiving instrument, brush arms positioned in operative relation to engage said projections during the rotation of said disks, said projections and brush arms being located in an electric circuit of the receiving instrument, means for rotating the disks, pins carried by said disks, said pins being located upon the disks just behind, in the direction of rotation, the last projection representing a character, a holding and a starting rod for each disk, located one on each side thereof, the starting rod of one disk being connected to the holding rod of the next, the end of the holding rods being shaped so as to stop the movement of a pin and the disk thereof when said pin engages it, the ends of the starting rods being so shaped that a pin in rotating, will pass under and lift the rod, this movement lifting the holding rod of the next disk to initiate its operation.

9. An apparatus for producing electric impulses representing a series of characters according to a code, comprising a plurality of disks, sets of projections upon the periphery of said disks, the number of said sets of projections being different for each disk, a receiving instrument, brush arms positioned in operative position to engage said projections during the rotation of said disks, said projections and brush arms being located in an electric circuit of the receiving instrument, means for rotating the disks, pins carried by said disks, said pins being located upon the disks just behind, in the direction of rotation, the last projection representing a character, a holding and a starting rod for each disk, located one on each side thereof, the starting rod of one disk being connected to the holding rod of the next, the end of the holding rods being shaped so as to stop the movement of a pin and the disk thereof when said pin engages it, the ends of the starting rods being so shaped that a pin, in rotating, will pass under and lift the rod, this movement lifting the holding rod of the next disk to initiate its operation.

10. An apparatus for producing electric impulses representing a series of characters according to a code, comprising a plurality of disks, contact operating members carried by said disks, a receiving instrument, contacts in the electric circuit of said instrument said contact operating members being adapted to close the contacts in the circuit of the receiving instrument, a shaft upon which said disks are loosely mounted, means for continuously rotating said shaft, frictional driving means between the shaft and disks for rotating the disks, pins carried by said disks, said pins being located upon the disks just behind, in the direction of rotation, the last projection representing a character, a holding and a starting rod for each disk, located one on each side thereof, the starting rod of one disk being connected to the holding rod of the next, the end of the holding rods being shaped so as to stop the movement of a pin and the disk thereof when said pin engages it, the ends of the starting rods being so shaped that a pin, in rotating, will pass under and lift the rod, this movement lifting the holding rod of the next disk to initiate its operation.

11. An apparatus for producing electric impulses representing a series of characters according to a code, comprising a plurality of disks, sets of projections upon the periphery of said disks, a receiving instrument, brush arms positioned in operative relation to engage said projections during the rotation of said disks, said projections and brush arms being located in an electric circuit of the receiving instrument, a shaft upon which said disks are loosely mounted, means for continuously rotating said shaft, frictional driving means between the shaft and disks for rotating the disks, pins carried by said disks, said pins being located upon the disks just behind, in the direction of rotation, the last projection representing a character, a holding and a starting rod for each disk, located one on each side thereof, the starting rod of one disk being connected to the holding rod of the next, the end of the holding rods being shaped so as to stop the movement of a pin and the disk thereof when said pin engages it, the ends of the starting rods being so shaped that a pin, in rotating, will pass under and lift the rod, this movement lifting the holding rod of the next disk to initiate its operation.

12. An apparatus for producing electric impulses representing a series of characters according to a code, comprising a plurality of disks, sets of projections upon the periphery of said disks the number of said sets of projections being different for each disk, a receiving instrument, brush arms positioned in operative relation to engage said projections during the rotation of said disks, said projections and brush arms being located in an electric circuit of the receiving instrument, a shaft upon which said disks are loosely mounted, means for continuously rotating said shaft, frictional driving means between the shaft and disks for rotating the disks, pins carried by said disks, said pins being located upon the disks just behind, in the direction of rotation, the last projection representing a character, a holding and a starting rod for each disk, located one on each side thereof, the starting rod of one disk being connected to the holding rod of the next, the end of the holding rods being shaped so as to stop the movement of a pin and the disk thereof when said pin engages it, the ends of the starting rods being so shaped that a pin, in rotating, will pass under and lift the rod, this movement lifting the holding rod of the next disk to initiate its operation.

13. An apparatus for producing electric impulses representing a series of characters according to a code, comprising a plurality of disks, contact operating members carried by said disks, a receiving instrument, contacts in the electric circuit of said instrument, said contact operating members being adapted to close the contacts in the circuit of the receiving instrument, a shaft upon which said disks are loosely mounted, means for continuously rotating said shaft, collars fixed to the shaft and engaging the sides of the disks for driving the same, pins carried by said disks, said pins being located upon the disks just behind, in the direction of rotation, the last projection representing a character, a holding and a starting rod for each disk, located one on each side thereof, the starting rod of one disk being connected to the holding rod of the next, the end of the holding rods being shaped so as to stop the movement of a pin and the disk thereof when said pin engages it, the ends of the starting rods being so shaped that a pin, in rotating, will pass under and lift the rod, this movement lifting the holding rod of the next disk to initiate its operation.

14. An apparatus for producing electric impulses representing a series of characters according to a code, comprising a plurality of disks, sets of projections upon the periphery of said disks, a receiving instrument, brush arms positioned in operative relation to engage said projections during the rotation of said disks, said projections and brush arms being located in an electric circuit of the receiving instrument, a shaft upon which said disks are loosely mounted, means for continuously rotating said shaft, collars fixed to the shaft and engaging the sides of the disks for driving the same, pins carried by said disks, said pins being located upon the disks just behind, in the direction of rotation, the last projection representing a character, a holding and a starting rod for each disk, located one on each side thereof, the starting rod of one disk being connected to the holding rod of the next, the end of the holding rods being shaped so as to stop the movement of a pin and the disk thereof when said pin engages it, the ends of the starting rods being so shaped that a pin, in rotating, will pass under and lift the rod, this movement lifting the holding rod of the next disk to initiate its operation.

15. An apparatus for producing electric impulses representing a series of characters according to a code, comprising a plurality of disks, sets of projections upon the periphery of said disks, the number of said sets of projections being different for each disk, a receiving instrument, brush arms positioned in operative relation to engage said projections during the rotation of said disks, said projections and brush arms being located in an electric circuit of the receiving instrument, a shaft upon which said disks are loosely mounted, means for continuously rotating said shaft, collars fixed to the shaft and engaging the sides of the disks for driving the same, pins carried by said disks, said pins being located upon the disks just behind, in the direction of rotation, the last projection representing a character, a holding and a starting rod for each disk, located one on each side thereof, the starting rod of one disk being connected to the holding rod of the next, the end of the holding rods being shaped so as to stop the movement of a pin and the disk thereof when said pin engages it, the ends of the starting rods being so shaped that a pin, in rotating, will pass under and lift the rod, this movement lifting the holding rod of the next disk to initiate its operation.

Dated this 16th day of June, 1919.

CECIL ROBERT WOODLAND.
REGINALD WOODLAND.

Witnesses:
C. G. CAIRD,
J. H. CHARLTON.